United States Patent
Nitschké et al.

[11] Patent Number: 6,117,580
[45] Date of Patent: Sep. 12, 2000

[54] CURRENT COLLECTOR FOR A FUEL CELL AND METHOD OF MAKING THE SAME

[75] Inventors: Felix Nitschké, Munich; Joerg Wind, Immenstaad, both of Germany

[73] Assignee: DaimlerChrysler AG, Stuttgart, Germany

[21] Appl. No.: 09/136,497

[22] Filed: Aug. 19, 1998

[30] Foreign Application Priority Data

Aug. 19, 1997 [DE] Germany ............ 197 35 854

[51] Int. Cl.[7] .................................. H01M 4/66
[52] U.S. Cl. .................. 429/34; 429/30; 429/33; 429/38; 429/39; 429/41; 429/44; 429/46; 429/16
[58] Field of Search ............... 429/30, 33, 34, 429/38, 39, 16, 46, 44, 41

[56] References Cited

U.S. PATENT DOCUMENTS

| | | | |
|---|---|---|---|
| 5,094,928 | 3/1992 | Dyer | 429/33 |
| 5,503,945 | 4/1996 | Petri et al. | 429/39 |
| 5,563,003 | 10/1996 | Suzuki et al. | 429/38 |
| 5,595,832 | 1/1997 | Tomimatsu et al. | 429/46 |
| 5,698,337 | 12/1997 | Nitschké et al. | 429/35 |
| 5,733,682 | 3/1998 | Quadakkers et al. | 429/210 |
| 5,795,665 | 8/1998 | Allen | 429/39 |
| 5,811,202 | 9/1998 | Petraglia | 429/38 |
| 5,989,740 | 11/1999 | Tomimatsu et al. | 429/16 |

FOREIGN PATENT DOCUMENTS

| | | |
|---|---|---|
| 19541187 | 11/1996 | Germany . |
| 19532791 | 12/1996 | Germany . |
| WO95/26576 | 10/1995 | WIPO . |

*Primary Examiner*—Bruce F. Bell
*Attorney, Agent, or Firm*—W. F. Fasse; W. G. Fasse

[57] ABSTRACT

A molten carbonate fuel cell is constructed of plural stacked individual cell units, that each respectively include a porous, electrolyte saturated matrix (3) sandwiched between a cathode (2) and an anode (4), and current collectors (5, 6) respectively arranged between the anode (4) and a first separator plate (7), and between the cathode (2) and a second separator plate (8). Especially the cathode current collector (6) includes a stainless steel core (16) that is coated on at least one surface with an aluminum-containing layer (14). Preferably both surfaces of the stainless steel core (16) are coated with aluminum-containing layers (14A, 14B), except for a contact area (12) at which the stainless steel core (16) directly contacts the cathode (2). The aluminum-containing layer (14) prevents or minimizes the occurrence of an oxidation reaction that would otherwise lead to significant loss of the electrolyte.

34 Claims, 2 Drawing Sheets

5mm

CURRENT COLLECTOR FOR A FUEL CELL AND METHOD OF MAKING THE SAME

PRIORITY CLAIM

This application is based on and claims the priority under 35 U.S.C. §119 of German Patent Application 197 35 854.3, filed on Aug. 19, 1997. The entire disclosure of German Patent Application 197 35 854.3 is incorporated herein by reference.

FIELD OF THE INVENTION

The invention relates to a current collector comprising a stainless steel sheet, and especially such a current collector arranged at the cathode of a molten carbonate fuel cell (MCFC), which for example comprises a plurality of stacked fuel cell units separated from one another by respective separator plates. The invention further relates to a method of making such a current collector.

BACKGROUND INFORMATION

A molten carbonate fuel cell typically comprises a stack of individual cells or cell units. Each individual cell comprises a cathode and an anode, with their associated current collectors, and a matrix saturated with the molten electrolyte arranged between the two respective electrodes. A fusible fluid alkali carbonate mixture is typically used as the electrolyte. For this reason, the operating temperature of the fuel cell is in the range from 500° C. to 700° C. The alkali carbonate mixture may comprise lithium carbonate and potassium carbonate mixtures, lithium carbonate and sodium carbonate mixtures, or a ternary mixture including lithium carbonate, potassium carbonate, and sodium carbonate. All three of these different mixtures share in common, that lithium carbonate is an absolutely necessary or essential component of the respective mixture.

The individual cells are respectively separated from one another by a gas-tight separator. Herein, the term "gas-tight" means "not gas permeable". According to one variation, the separator comprises a flat planar plate, while the gas permeable cathode current collector has a wavy corrugated configuration and is arranged between the cathode and the separator plate, and the anode current collector similarly has a wavy corrugated configuration and is arranged between the anode and the respective separator plate. This construction forms a respective first gas supply passage for supplying air or some other oxygen-containing gas to the cathode, and a respective second gas supply passage for supplying hydrogen or other fuel gases to the anode. According to another variation, the wavy corrugated current collectors are gas-tight, so that they simultaneously form the necessary separators.

Thus, the respective current collectors serve dual purposes. First, the current collectors conduct and carry the electrochemically generated current away from or to the respective cathode or anode. Secondly, the current collectors form the passages or spaces necessary for supplying the reaction gases to the cathode or the anode respectively.

In order to mechanically strengthen the cathode, it is possible to additionally provide a gas permeable, electrically conducting, flat planar metal support plate between the cathode and the wavy corrugated cathode current collector or the wavy corrugated separator plate. The support plate may, for example, be embodied as a perforated metal plate or sheet.

Due to the supply of air or other oxygen-containing gas, and the high operating temperature, the current collector provided for the cathode is subject to severe corrosion effects. In order to resist the corrosive attack, the respective current collector and the other components located in the cathodic half space in the fuel cell are made of a high alloy stainless steel, which contains at least 16 wt. % of chromium. Nonetheless, it has been found in practice that oxide layers form on the surfaces of these components during operation of the fuel cell. While these oxide layers are mostly electrically well conducting, they lead to a loss of the electrolyte however. Namely, on the one hand, the iron oxide, chromium oxide, or other metal oxide of the oxide layer reacts with the lithium ions of the electrolyte while forming lithium ferrite, lithium chromite, or the like, and on the other hand, the potassium or sodium ions of the electrolyte reacting with the chromium oxide of the oxide layer form potassium chromate and/or sodium chromate. In this manner, the electrolyte is chemically broken down and lost, which leads to a degradation of the cell and therewith a decrease in the cell output power.

SUMMARY OF THE INVENTION

In view of the above, it is an object of the invention to provide a current collector arrangement, whereby the loss of electrolyte due to the formation of oxide layers on components in the cathodic half space of a molten carbonate fuel cell can be prevented or minimized, without negatively influencing the electrical conductivity of the current collector. The invention further aims to overcome or avoid the disadvantages of the prior art, and to achieve additional advantages, as apparent from the present description.

The above objects have been achieved by the inventive current collector arrangement in a fuel cell and particularly a molten carbonate fuel cell, which preferably comprises a stack of fuel cell units separated from one another by respective separator plates, wherein the current collector includes a stainless steel core sheet and is arranged in electrical contact with the cathode of the respective fuel cell units. Particularly according to the invention, the current collector is provided with a coating layer of aluminum or an aluminum-containing alloy on at least one surface of the stainless steel core sheet.

According to further detailed features of the invention, the aluminum or aluminum-containing alloy layer is provided on the surface of the current collector facing the cathode, but the contact areas between the current collector and the cathode are left uncoated, i.e. the aluminum-containing layer is omitted at these contact areas. While aluminum from the aluminum-containing layer may be diffused into the stainless steel core sheet during operation of the fuel cell, the layer thickness of the aluminum-containing layer and other component dimensions are preferably so selected that the extent or depth of the diffusion is less than half of the diameter of the contact area between the current collector and the cathode. In this manner, it is ensured that a good electrical conduction path is maintained between the cathode and the current collector, without suffering increased electrical resistance due to the formation of an aluminum oxide because of the diffusion of aluminum into and across the entire contact area. According to two structural embodiments, the current collector may simultaneously form a separator plate between two fuel cell units, or may be arranged between the cathode and a distinct separator plate.

The corrugated current collector forms the largest surface area in the cathodic half space in the fuel cell, which is subjected to corrosive effects. Thus, the exposed surface of the current collector can lead to the correspondingly greatest loss of electrolyte if corrosion takes place. For this reason, the invention calls for at least one surface of the cathode current collector to be coated at least partially with an aluminum-containing layer, i.e. a layer of aluminum or of an aluminum-containing alloy. For simplicity, such an aluminum-containing layer is sometimes referred to herein as an "aluminum layer", which term is to be understood as referring to a layer of pure aluminum or any aluminum-containing material, unless otherwise designated. The aluminum layer provides an effective corrosion protection for the underlying stainless steel sheet. In this manner, the formation of a constantly growing oxide layer on the surface of the stainless steel sheet, which leads to a great loss of electrolyte, is prevented in the aluminum-coated areas.

The corrosion protection is provided especially by a thin aluminum oxide layer that forms on the surface of the aluminum layer. While this aluminum oxide layer also reacts with the lithium of the electrolyte, the resulting loss of electrolyte is completely negligible, because the thickness of the aluminum oxide layer amounts to less than 1 $\mu$m so that very minimal reaction with the lithium takes place.

It has been found that in practice it is not necessary to carry out any method steps for forming the aluminum oxide layer on the aluminum layer while manufacturing the fuel cell, because the protective aluminum oxide layer will be formed on the aluminum layer within the first few hours of operation of the molten carbonate fuel cell at its normal operating temperature in the range from 500° C. to 700° C. Thus, the cathode current collector can be considered finished in its production once the stainless steel sheet has been coated with the aluminum layer, and the aluminum oxide layer will be self-formed during the first operation of the fuel cell. In this manner, a perfect corrosion protection is provided from essentially the very beginning of operation of the fuel cell, even without carrying out manufacturing process steps for providing the aluminum oxide layer.

Instead of being made of essentially pure aluminum or an aluminum based alloy, the coating layer provided on the cathode current collector may comprise an alloy containing a relatively smaller proportion of aluminum, for example preferably an aluminum-containing stainless steel. Such an alloy should contain at least three weight percent of aluminum, and further preferably comprises chromium and particularly at least 8 wt. % of chromium. It has been determined that a particularly suitable stainless steel is type PM 2000 stainless steel, which has the following nominal composition: 19 wt. % Cr, 5.5 wt. % Al, 0.5 wt. % Ti, 0.5 wt. % $Y_2O_3$, with the remainder Fe (allowing for the usual variation from the intended nominal values that arises in the field of alloying stainless steels, for example allowing for unavoidable impurities and the like). This type PM 2000 stainless steel has a Vickers hardness HV10 at room temperature of 290 in a recrystallized state, and of 330 in a non-recrystallized state. Furthermore, the type PM 2000 stainless steel has the following physical characteristics, as shown in Table 1.

TABLE 1

PHYSICAL CHARACTERISTICS
OF TYPE PM 2000 STAINLESS STEEL

| CHARACTERISTIC | TEST CONDITIONS | VALUE |
| --- | --- | --- |
| MELTING POINT | — | 1480° C. |
| CURIE TEMPERATURE | — | 553° C. |

TABLE 1-continued

PHYSICAL CHARACTERISTICS
OF TYPE PM 2000 STAINLESS STEEL

| CHARACTERISTIC | TEST CONDITIONS | VALUE |
| --- | --- | --- |
| MODULUS OF ELASTICITY | 20° C. | 218 kN/mm$^2$ |
| EXPANSION COEFICIENT | 50° C. | 10.7 × 10$^{-6}$/K |
| DENSITY | 20° C. | 7.18 g/cm$^3$ |
| SPECIFIC THERMAL CAPACITY | 20° C. | 480 J/kg K |
| THERMAL CONDUCTIVITY | 20° C. | 10.9 W/mK |
| THERMAL DIFFUSIVITY | 20° C. | 3.1 × 10$^{-6}$ m$^2$/s |
| ELECTRICAL RESISTIVITY | 20° C. | 1.31 × 10$^{-6}$ $\Omega$m |
| COERCIVE FIELD STRENGTH | 20° C. | 290 A/m |

The type PM 2000 stainless steel material further typically has a grain structure in a rod or bar form, as shown in FIG. 3 of the drawings.

Since aluminum oxide has a rather high electrical resistivity, it must be ensured that an aluminum oxide layer is not formed on the current-conducting contact areas of the cathode current collector adjoining the cathode. This is achieved according to the invention by omitting the aluminum layer from the cathode current collector at the current-conducting contact areas. This feature of the invention, namely the omission of the aluminum layer from the contact areas of the current collector, applies especially to the contact area or areas between the current collector and the cathode or between the current collector and a perforated supporting plate that supports the cathode. At these contact areas it is particularly important to omit the aluminum layer, because at these particular contact areas the aluminum layer would definitely lead to the formation of an aluminum oxide layer, because these contact areas are provided with oxygen through the porosity of the cathode or the perforations of the supporting plate. In other words, since oxygen has direct access to these contact areas through the porous cathode or through the perforated supporting plate, the invention particularly omits the aluminum layer from these contact areas.

In contrast, the opposite surface of the corrugated cathode current collector is tightly pressed against the non-porous and non-gas-permeable separator plate at the respective contact areas, according to the first embodiment of the fuel cell. Therefore, the contact areas between the current collector and the separator plate are not subjected to the direct supply of and reaction with oxygen, and thus may be coated with an aluminum layer. In other words, the surface of the cathode current collector facing the separator plate can be coated with a continuous, solid aluminum-containing layer, even at the contact areas between the current collector and the separator plate. In order to ensure that the aluminum layer at these contact areas is in direct tight contact with the separator plate so that oxygen access is prevented, the outer surface of the aluminum layer may be provided with a flat planar surface configuration, either by means of a corresponding planar configuration of the stainless steel core sheet at these areas, or by grinding the outer surface flat at these areas, for example.

Under the operating conditions of the fuel cell, the aluminum of the aluminum-containing layer on the contact area between the cathode current collector and the separator plate may diffuse into the respective base materials of the cathode current collector and of the separator plate. For this reason, an intermetallic compound may be formed at the contact area, and it is therefore necessary to prevent the access of oxygen to this contact area in order to avoid oxidation. To achieve this, another intermetallic connection, for example a solder connection, can be provided between the cathode current collector and the separator plate. Alternatively, the aluminum layer could be removed from the current collector at this contact area, for example by means of grinding or the like.

In order to prevent or reduce the loss of electrolyte to the absolute minimum, the cathode current collector is preferably provided with an aluminum layer on both sides thereof, whereby this aluminum layer is omitted at least at the contact areas between the cathode and the cathode current collector or between the cathode and the above described gas permeable support plate. On the other hand, the aluminum layer on the surface of the cathode current collector facing the separator plate may be a continuous coating layer also covering the contact areas between the current collector and the separator plate, or the aluminum layer can be omitted or removed at these contact areas as well, as has been described above.

In an alternative configuration, the cathode current collector is arranged with substantially continuous uniform surfacial contact on the cathode or on the perforated or porous support plate adjacent the cathode. In such a configuration, the surface of the cathode current collector on this side, which is not contacted by the cathode or the support plate, and thus can be inherently protected against oxidation by the aluminum oxide layer, can be relatively small. In such a case, it can be advantageous to entirely omit the aluminum layer from the cathode-facing side of the cathode current collector, because providing such an aluminum layer on this side of the collector would only achieve a minimal reduction in the loss of electrolyte.

Since the aluminum layer is missing or has been omitted or removed from the cathode current collector, at least at the contact surfaces with the cathode, the stainless steel sheet forming the core or base material of the cathode current collector is exposed at these areas and can be corroded from these contact surfaces into the interior thereof. In order to prevent this corrosion, a corrosion resistant stainless steel sheet is used in the first place.

Specifically, the stainless steel preferably has a chromium content of at least 5 wt. % and even more preferably at least 10 wt. %. However, the chromium content of the stainless steel should not be more than 17 wt. %, and preferably not more than 15 wt. %, because otherwise an excessively high electrical resistance will arise at the contact area. This is believed to result because chromium oxide has a greater electrical resistivity than the other oxides formed from the stainless steel, and especially iron oxide. For the same reason, the stainless steel should not contain any aluminum, if possible, and also should not contain any yttrium, titanium or cerium, since these metals lead to the formation of oxides having extremely high electrical resistivities. Thus, the stainless steel preferably has a content of aluminum, yttrium, titanium and/or cerium of at most 0.2 wt. %, and preferably at most 0.05 wt. %, and most preferably 0 wt. %.

Moreover, it has been determined to be advantageous if the stainless steel has a cobalt content in the range from 3 wt. % to 15 wt. %, and especially in the range from 5 wt. % to 10 wt. %. It is believed that this advantageous effect results because a cobalt doping effect considerably increases the electrical conductivity of the lithium ferrite that is formed from the iron oxide at the contact area.

The above objects have also been achieved according to the invention in a method of making the current collector and arranging the current collector in the fuel cell, including a step of coating a perforated and corrugated stainless steel sheet with an aluminum layer, i.e. aluminum-containing layer, on at least one surface thereof. The sheet may have been pre-perforated and pre-corrugated to provide for the necessary gas permeation and to form the gas supply passages, or the method may include preliminary steps of forming the perforations and corrugations in the stainless steel sheet.

The coating step can be carried out using any known and suitable coating method, for example physical vapor deposition (PVD), chemical vapor deposition (CVD), galvanic coating methods, plasma spraying, flame spraying and especially high velocity flame spraying, or plating. In order to avoid the coating application of the aluminum layer at the current-conducting contact areas of the current collector, these surface areas on the stainless steel sheet may be covered or shielded before carrying out the coating process. Alternatively, the aluminum layer may be continuously and uniformly coated onto the stainless steel sheet, and thereafter the respective pertinent surface areas may again be exposed by grinding or otherwise abrasively removing the aluminum layer.

BRIEF DESCRIPTION OF THE DRAWINGS

In order that the invention may be clearly understood, it will now be described, in connection with an example embodiment, with reference to the drawings, wherein.

DETAILED DESCRIPTION OF PREFERRED EXAMPLE EMBODIMENTS AND OF THE BEST MODE OF THE INVENTION

Figure 1:
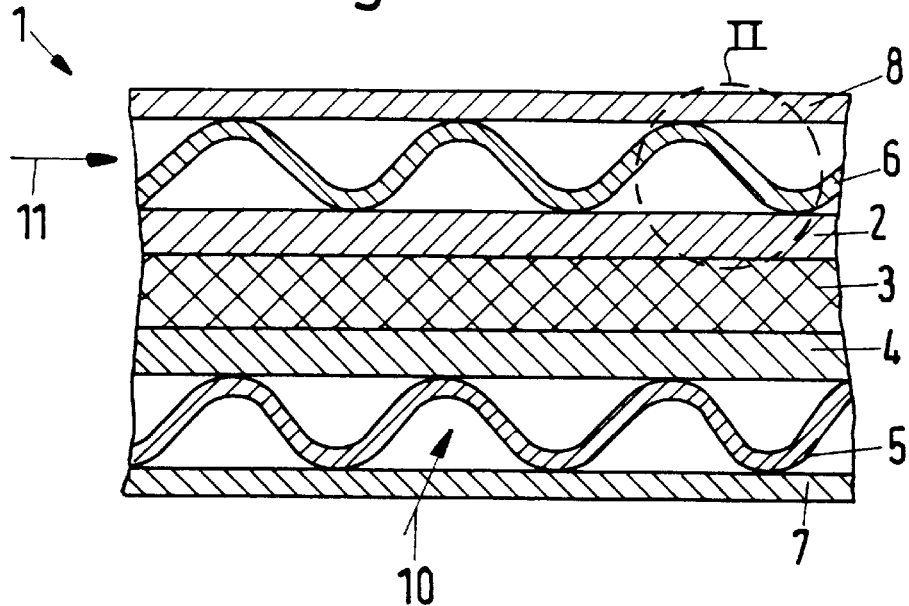
FIG. 1 is a schematic fragmentary sectional view of a molten carbonate fuel cell unit including a current collector arrangement according to the invention.

A molten carbonate fuel cell comprises a plurality of individual fuel cell units 1 stacked on top of one another. FIG. 1 shows an individual fuel cell unit 1 comprising a cathode 2, a porous matrix 3 saturated with a molten electrolyte, an anode 4, an anode current collector 5, a cathode current collector 6, a bottom separator plate 7, and a top separator plate 8. The components are arranged with the porous matrix 3 sandwiched between the cathode 2 and the anode 4, the cathode current collector 6 arranged between and contacting the top separator plate 8 and the cathode 2, and the anode current collector 5 arranged between and contacting the bottom separator plate 7 and the anode 4. The cathode 2 consists essentially of a porous metal oxide, for example. The anode 4 consists essentially of a porous sintered metal plate, for example.

Both the anode current collector 5 and the cathode current collector 6 are respectively gas permeable and corrugated with a wavy cross-sectional shape. Therefore, the anode current collector 5 forms a gas flow space or passages 10 between the anode 4 and the bottom separator plate 7 for supplying hydrogen or another fuel gas to the anode 4, in a flow direction substantially perpendicular to and into the plane of the drawing of FIG. 1 as represented by the arrow 10. Similarly, the cathode current collector 6 forms a gas supply space or passages 11 between the top separator plate 8 and the cathode 2, for supplying air or some other oxygen-containing gas to the cathode 2 in a flow direction perpendicular to that of the passages 10, namely from the left to the right in the plane of the drawing of FIG. 1. In this context, the corrugations of the cathode current collector 6 may be arranged to extend perpendicularly to those of the anode current collector 5, but for the sake of simplicity in the schematic illustration, FIG. 1 shows the corrugations of both current collectors 5 and 6 extending in the same direction.

The cathode current collector 6 includes a stainless steel core sheet 16, as will be described below, and is in electrical contact with the cathode 2 for conducting the electrochemically generated current from the cathode 2. The anode current collector 5 may also comprise a stainless steel sheet and is in electrical contact with the anode 4 for conducting the current flow to the anode 4.

Figure 2:
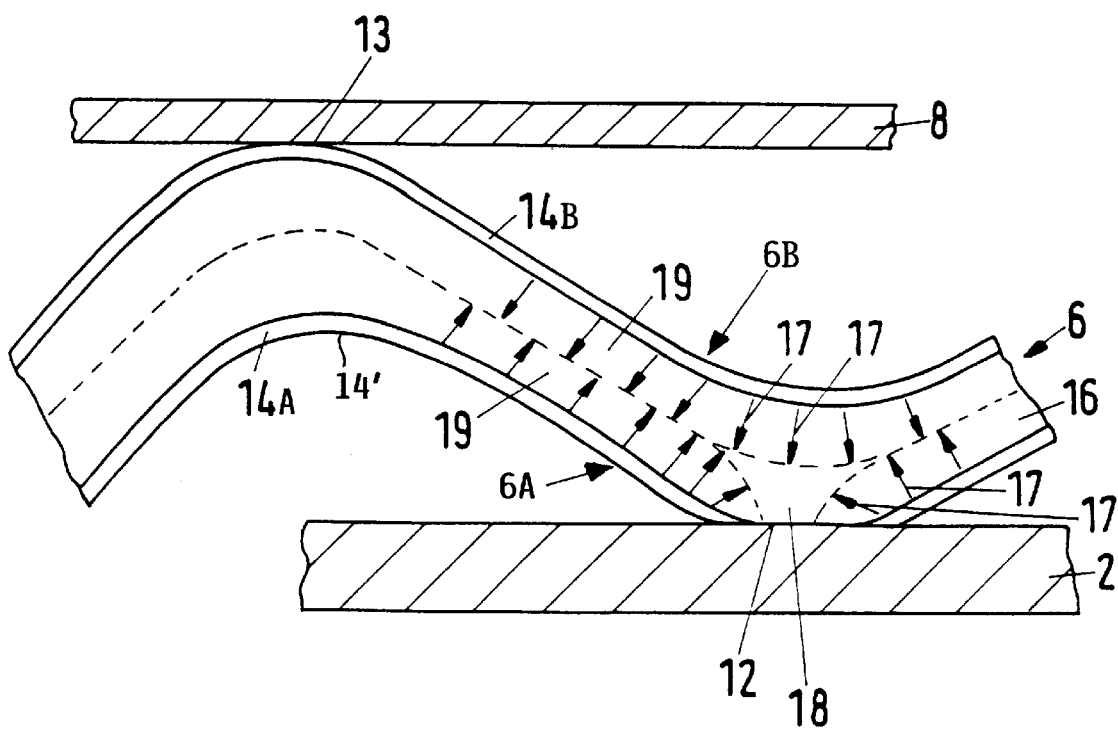
FIG. 2 is an enlarged detail sectional view of the detail area II of the cathode current collector in the fuel cell unit of FIG. 1.
Figure 3:
FIG. 3 is a photomicrograph of the grain structure of a rod or bar of type PM 2000 stainless steel that is suitable for use according to the invention.

As shown in the detail view of FIG. 2, the cathode current collector 6 has a first contact area 12 adjoining the cathode 2 and a second contact area 13 adjoining the separator plate 8. The cathode current collector 6 comprises a core or base material 16 of stainless steel, which is coated on the side 6A thereof facing the cathode 2 with a thin aluminum layer 14A, except for the contact area 12, at which the core or base material 16 is not coated, but rather left exposed. The other side of the core or base material 16 of the cathode current collector 6, namely the side 6B facing the separator plate 8, is similarly coated with an aluminum layer 14B, even covering the contact area 13 at which the cathode current collector 6 contacts the separator plate 8. The aluminum layers 14A and 14B may comprise any aluminum-containing material or materials.

Once the molten carbonate fuel cell is placed into operation, due to the supply of oxygen as represented by the flow arrow 11 in connection with the high operating temperatures, the aluminum layers 14A and 14B will undergo an oxidation process, and in a very short time period lead to the formation of a continuous, solid, corrosion resistant aluminum oxide film 14' on the outer surface of the aluminum layers 14A and 14B, except directly at the contact area 13 pressed against the separator plate 8. This thin aluminum oxide film 14' protects the cathode current collector 6, except for the contact area 13, from any further corrosion. However, since the aluminum oxide film has a thickness of less than 1 $\mu$m, any loss of electrolyte resulting from the minimal oxidation process and associated reactions would be negligible. Thus, a loss of electrolyte occurs essentially only at the contact area 13, at which the stainless steel base material or core 16 of the cathode current collector 6 can become corroded. However, the surface area of the contact area 13 relative to the total surface area of the cathode current collector 6 is so small, that the resulting loss of electrolyte in the fuel cell according to the invention is correspondingly minimal.

Since the cathode current collector 6 is pressed against the separator plate 8 at the contact area 13, the contact area 13 between the aluminum layer 14 and the separator plate 8 will be sealed from and not exposed to the oxygen-containing environment existing in the cathodic half space. This prevents the formation of an aluminum oxide layer on the contact area 13, which would otherwise lead to a high electrical transition or junction resistance.

The stainless steel core or base material 16 of the cathode current collector 6 may have a thickness in the range from 0.1 mm to 0.5 mm, for example. The aluminum of the aluminum layer 14 diffuses into the stainless steel base material 16 during operation of the fuel cell. This diffusion of aluminum into the stainless steel base material 16 also occurs from the sides into the region of the contact area 12, as represented by arrows 17. The aluminum diffused into the region of the contact area 12 forms aluminum oxide, which has a high electrical resistivity. Thus, steps should be taken to ensure that at least a portion of the contact area 12 remains free of aluminum oxide, i.e. to ensure that a low resistance conduction path remains.

To achieve this, the layer thickness of the aluminum layer 14, as well as the width of the contact area 12 and the thickness of the stainless steel core 16 are selected so that the resulting depth of diffusion of aluminum into the stainless steel base material 16, defining the aluminum diffusion zone 19, is less than half of the diameter or width dimension of the contact area 12 at which the cathode current collector 6 adjoins the cathode 2. As a result, an oxide-free region 18 remains along the center of the contact area 12, and thus the oxidation processes cannot form the highly resistive aluminum oxide at this region 18. Moreover, the thickness of the stainless steel core sheet 16 is preferably more than twice the diffusion depth defining the diffusion zone 19, so that an aluminum-free conduction path remains along the core of the stainless steel sheet. In other words, the inventive arrangement ensures that the current flow path from the cathode 2 through the contact area 12 and then through the stainless steel core or base material 16 to the separator plate 8 remains free of aluminum oxide, particularly in the region 18. In this manner, the current flow path will maintain a high electrical conductivity.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The phrase "essentially consists of" as used herein is intended to allow for additional trace amounts of non-specified constituents such as unavoidable impurities in the respective composition.

What is claimed is:

1. In a fuel cell including a plurality of stacked fuel cell units, wherein each said fuel cell unit includes a cathode, an anode, and a cathode current collector electrically connected to said cathode, an improvement wherein said cathode current collector comprises a stainless steel core sheet having a first major surface facing toward said cathode and a second major surface facing away from said cathode, and at least one aluminum-containing layer on at least a portion of at least one of said major surfaces of said stainless steel core sheet.

2. The improvement in the fuel cell according to claim 1, wherein said fuel cell is a molten carbonate fuel cell further comprising a porous matrix saturated with a fusible carbonate electrolyte sandwiched between said cathode and said anode.

3. The improvement in the fuel cell according to claim 2, wherein said fusible carbonate electrolyte comprises a lithium carbonate.

4. The improvement in the fuel cell according to claim 1, wherein said aluminum-containing layer consists essentially of pure non-alloyed aluminum.

5. The improvement in the fuel cell according to claim 1, wherein said aluminum-containing layer consists essentially of an aluminum-containing alloy.

6. The improvement in the fuel cell according to claim 5, wherein said aluminum-containing alloy is a stainless steel containing aluminum.

7. The improvement in the fuel cell according to claim 6, wherein said stainless steel containing aluminum contains at least 3 wt. % of said aluminum and at least 8 wt. % of chromium.

8. The improvement in the fuel cell according to claim 6, wherein said stainless steel containing aluminum consists essentially of 19 wt. % chromium, 5.5 wt. % aluminum, 0.5 wt. % titanium, 0.5 wt. % yttrium oxide, and a remainder of iron.

9. The improvement in the fuel cell according to claim 1, wherein said cathode current collector is arranged to be in contact with said cathode at at least one cathode contact area, said aluminum-containing layer is arranged on said first major surface of said cathode current collector facing toward said cathode on a portion thereof distinct from said at least one cathode contact area, said aluminum-containing layer is not arranged at said at least one cathode contact area, and said stainless steel core sheet is directly in contact with said cathode at said at least one cathode contact area.

10. The improvement in the fuel cell according to claim 9, wherein aluminum from said aluminum-containing layer has diffused into said stainless steel core sheet and formed an aluminum-containing diffusion zone therein, and wherein a respective width of said cathode contact area, a thickness of said stainless steel core sheet, and a thickness of said aluminum-containing layer are so dimensioned relative to each other so that a diffusion depth of said aluminum into said stainless steel core sheet in said diffusion zone is less than half of said width of said cathode contact area.

11. The improvement in the fuel cell according to claim 9, wherein aluminum from said aluminum-containing layer has diffused into said stainless steel core sheet and formed an aluminum-containing diffusion zone therein, and wherein said aluminum-containing diffusion zone does not extend entirely across said cathode contact area.

12. The improvement in the fuel cell according to claim 9, wherein said second major surface of said stainless steel core sheet facing away from said cathode is exposed and does not have said aluminum-containing layer arranged thereon.

13. The improvement in the fuel cell according to claim 9, wherein said second major surface of said stainless steel core sheet facing away from said cathode is entirely covered by a continuous one of said at least one aluminum-containing layer arranged thereon.

14. The improvement in the fuel cell according to claim 13, wherein each said fuel cell unit further comprises at least one separator plate separating each one of said fuel cell units from a respective adjacent one of said fuel cell units, and wherein said cathode current collector is arranged with said continuous aluminum-containing layer in contact with said separator plate at at least one separator contact area.

15. The improvement in the fuel cell according to claim 9, wherein each one of said fuel cell units further comprises at least one separator plate separating each one of said fuel cell units from a respective adjacent one of said fuel cell units, said cathode current collector is arranged to be in contact with said separator plate at at least one separator contact area, said aluminum-containing layer is arranged on said second major surface of said cathode current collector facing away from said cathode on a portion thereof distinct from said at least one separator contact area, said aluminum-containing layer is not arranged at said at least one separator contact area, and said stainless steel core sheet is directly in contact with said separator plate at said at least one separator contact area.

16. The improvement in the fuel cell according to claim 1, wherein said at least one aluminum-containing layer is arranged on said second major surface of said stainless steel core sheet facing away from said cathode and not on said first major surface of said stainless steel core sheet facing toward said cathode, which is in surfacial contact with said cathode.

17. The improvement in the fuel cell according to claim 1, wherein said cathode current collector simultaneously serves as a separator plate separating a respective one of said fuel cell units from an adjacent one of said fuel cell units.

18. The improvement in the fuel cell according to claim 17, wherein said cathode current collector is non-gas-permeable.

19. The improvement in the fuel cell according to claim 1, wherein each one of said fuel cell units further comprises at least one separator plate separating each one of said fuel cell units from a respective adjacent one of said plurality of fuel cell units, and said cathode current collector is arranged between said cathode and said separator plate.

20. The improvement in the fuel cell according to claim 19, wherein said cathode current collector is gas permeable.

21. The improvement in the fuel cell according to claim 1, wherein said cathode current collector has a wavy corrugated configuration and perforations therethrough.

22. The improvement in the fuel cell according to claim 1, further comprising a gas permeable support plate arranged between and in contact with said cathode and said cathode current conductor.

23. The improvement in the fuel cell according to claim 1, further comprising a layer of aluminum oxide formed on a surface of said aluminum-containing layer, wherein said layer of aluminum oxide has a thickness of less than 1 $\mu$m.

24. The improvement in the fuel cell according to claim 1, wherein said stainless steel core sheet consists essentially of a stainless steel material containing from 5 wt. % to 16 wt. % of chromium.

25. The improvement in the fuel cell according to claim 1, wherein said stainless steel core sheet consists essentially of a stainless steel material containing from 3 wt. % to 12 wt % of cobalt.

26. The improvement in the fuel cell according to claim 1, wherein said stainless steel core sheet consists essentially of a stainless steel material containing from 0 wt. % to 0.2 wt. % of one or more of aluminum, yttrium, titanium, and cerium.

27. The improvement in the fuel cell according to claim 1, wherein said stainless steel core sheet consists essentially of a stainless steel material that contains no aluminum at least in a core region of said stainless steel core sheet.

28. The improvement in the fuel cell according to claim 1, wherein said stainless steel core sheet has a thickness of from 0.1 mm to 0.5 mm.

29. A method of making the fuel cell including the improvement according to claim 1, comprising the following steps:
 a) providing said stainless steel core sheet that has perforations therethrough and that is bent in a configuration for forming a gas flow passage;
 b) applying said at least one aluminum-containing layer on at least one of said major surfaces of said stainless steel core sheet to form said cathode current collector; and
 c) providing said anode and said cathode, and assembling said cathode current collector electrically connected to said cathode at at least one cathode contact area.

30. The method according to claim 29, further comprising a step of covering said at least one cathode contact area on said stainless steel core sheet before carrying out said applying of said at least one aluminum-containing layer.

31. The method according to claim 29, wherein said step b) comprises coating a continuous layer of an aluminum-containing material onto said at least one major surface of said stainless steel core sheet, further comprising a step of removing an area of said continuous layer at said at least one cathode contact area, and wherein said step c) comprises arranging said stainless steel core sheet in direct contact with said cathode at said cathode contact area.

32. The method according to claim 29, wherein said step b) comprises coating a continuous layer of an aluminum-containing material onto said second major surface of said stainless steel core sheet, and further comprising providing a separator plate and assembling said cathode current collector with said continuous layer of an aluminum-containing material in contact with said separator plate.

33. A cathode current collector for conducting current from a cathode of a fuel cell, said current collector comprising a stainless steel core sheet, and an aluminum-containing layer on at least a portion of at least one major surface of said stainless steel core sheet.

34. The cathode current collector according to claim 33, wherein said stainless steel core sheet has a wavy corrugated configuration including corrugation peaks and corrugation valleys, and wherein said aluminum-containing layer does not cover at least one cathode contact area of said core sheet at at least one of said corrugation peaks, at which said stainless steel core sheet remains exposed.

* * * * *